United States Patent [19]
Csatlos

[11] 3,837,689
[45] Sept. 24, 1974

[54] TELESCOPING TUBE ASSEMBLY

[75] Inventor: Geza M. Csatlos, Wadsworth, Ohio

[73] Assignee: Akron Standard, division of Eagle-Picher Industries, Inc., Akron, Ohio

[22] Filed: Aug. 28, 1973

[21] Appl. No.: 392,252

[52] U.S. Cl. ............................................. 285/302
[51] Int. Cl. .......................................... F16l 15/02
[58] Field of Search .......... 285/302, 130, 165, 224, 285/298, 31, 32, 348, 354, 416

[56] References Cited
UNITED STATES PATENTS

| | | | |
|---|---|---|---|
| 2,080,271 | 5/1937 | Hirst | 285/348 X |
| 2,912,262 | 11/1959 | Franck | 285/348 X |
| 3,194,592 | 7/1965 | Boughton | 285/348 X |
| 3,284,114 | 11/1966 | McCord et al | 285/302 X |

Primary Examiner—Geo. V. Larkin
Attorney, Agent, or Firm—Wood, Herron & Evans

[57] ABSTRACT

An assembly for maintaining a fluid pressure seal between rigid telescoping conduit tubes. The assembly comprises a flange nut, a round flange, a ring collar, and elastomeric annular seals located and positioned coaxially around rigid telescoping conduit tubes.

1 Claim, 1 Drawing Figure

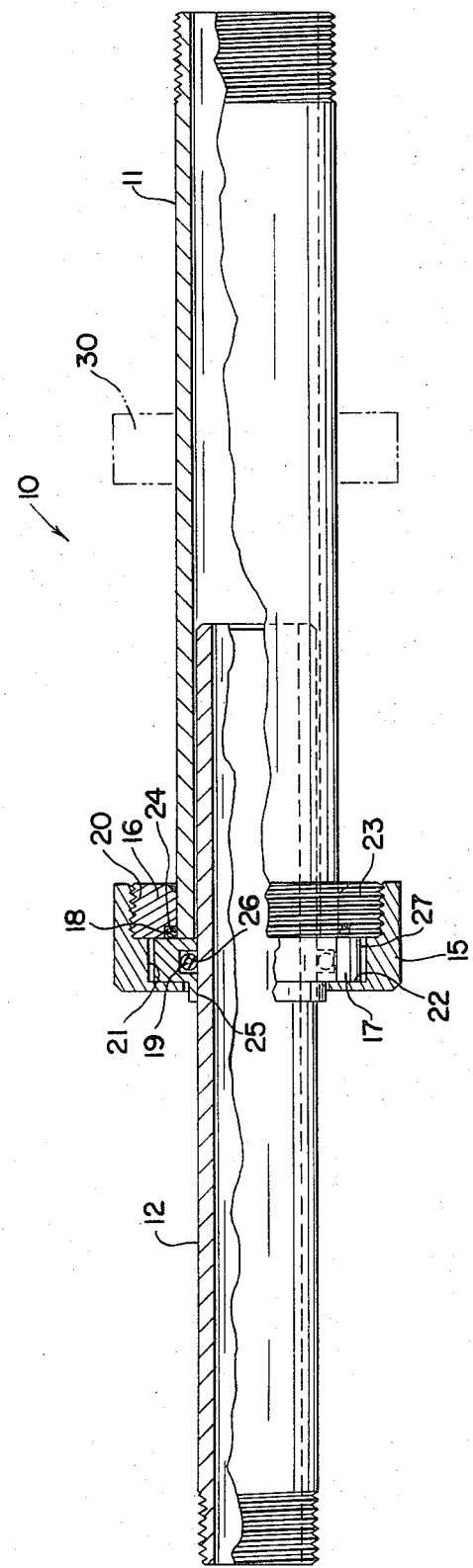

TELESCOPING TUBE ASSEMBLY

BACKGROUND OF THE INVENTION

The present invention relates to an assembly for maintaining a fluid pressure seal between rigid telescoping conduit tubes.

More particularly, the invention relates to an assembly used to maintain and seal rigid telescoping conduit tubes connecting a stationary manifold with a pressure chamber and an apparatus component intended for movement toward and away from the manifold via the selective supply and exhaust of fluid pressure through the conduits to and from the pressure chamber.

Specifically, the invention relates to an assembly for maintaining a fluid pressure seal between rigid conduit tubes used to supply pressure fluid for the actuation of various components of a radial tire building drum.

The present invention has been made because commercially available fluid pressure seal devices or components were not satisfactory for use in the actuation of various components of a radial tire building drum. The design requirements were such that the fluid pressure distributed from a stationary manifold was to be supplied to and exhausted from various pressure chambers and drum components movable axially of the drum shaft. The movement of the drum components required that the dimensional stability of the drum components, both axially and radially of the shaft, be precisely maintained at all times. Conventional flexible conduit or tubing would not have worked; rigid telescopic conduit tubes could satisfy the design requirement. The assembly of the present invention has been found to provide the necessary fluid pressure seal between rigid telescoping conduit tubes.

The prior patent art has been reviewed and U.S. Pat. No. 2,080,271, May/1937, Hirst, and No. 2,912,262, Nov./1959, Franck, have been selected as the most pertinent prior art. It has also been determined that the search field includes Class 285, sub-classes 31, 32, 298, 302, 348, 354, and 416.

SUMMARY OF THE INVENTION

It is an object of the present invention to provide an improved assembly for maintaining a fluid pressure seal between rigid telescoping conduit tubes.

It is a further object to provide an improved assembly for maintaining and sealing rigid telescoping conduit tubes connecting a stationary manifold with a pressure chamber in an apparatus component intended for movement toward and away from the manifold via the selective supply and exhaust of fluid pressure through the conduits to and from the pressure chamber.

Still further, it is an object to provide an assembly for maintaining a fluid pressure seal between rigid telescoping conduit tubes used to supply fluid pressure for the actuation of various components of a radial tire building drum. However, a telescoping tube assembly according to the invention could be used in apparatus environments and embodiments other than radial tire building drums.

These and other objects of the present invention, and the advantages thereof, will be apparent in view of the Detailed Description of the Invention as set forth below.

In general, an assembly for maintaining a fluid pressure seal between rigid telescoping conduit tubes according to the invention comprises a flange nut, a round flange, a ring collar, and elastomeric annular seals located and positioned coaxially around the telescoping tubes.

The assembly according to the invention is characterized in that the flange nut has an axial bore with interior threads for mating engagement with a round flange, an annular recess for movably enclosing the body portion of a ring collar, and a radially directed surface for positioning engagement with a ring collar.

The round flange is secured coaxially to one end of a larger diameter tube and has peripheral threads thereon for mating engagement with the interior threads of a flange nut and an axially outwardly opening annular recess housing an elastomeric seal.

The ring collar has an interior bore surface slidably seated coaxially around the smaller diameter tube and has a radially inwardly opening annular recess therein housing an elastomeric seal.

The body portion of the ring collar has a radial extent less than the inner diameter of the annular recess in the bore of the flange nut and sufficient to overlay the recess in the round flange housing an elastomeric seal.

The flange nut will enclose and position the ring collar in fluid pressure sealing relation to the round flange and the elastomeric seals, while permitting limited radial movement of the telescoping tubes.

DESCRIPTION OF THE DRAWINGS

The FIGURE is a plan view illustrating a telescoping tube assembly according to the invention.

DETAILED DESCRIPTION OF THE INVENTION

An assembly according to the invention, referred to generally by the numeral 10, is used for maintaining a fluid pressure seal between rigid telescoping conduit tubes 11 and 12. The larger diameter tube 11 is positioned coaxially around the smaller diameter tube 12.

The assembly 10 comprises a flange nut 15, a round flange 16, a ring collar 17, and elastomeric "O-ring" or seal elements 18 and 19.

The flange nut 15 has an axial bore with interior threads 20 for mating engagement with the round flange 16. The flange nut 15 also has an annular recess 21 for movably enclosing the body portion of the ring collar 17. The flange nut 15 further has a radially directed surface 22 for positioning engagement with the ring collar 17.

The round flange 16 is secured coaxially to one end of the larger tube 11, as by welding thereon. Alternatively, the round flange 16 could be fabricated integrally with the tube 11, as by forging or casting and subsequent machining. In either form, the round flange 16 has peripheral threads 23 for mating engagement with the interior threads 20 of the flange nut 15. The round flange 16 also has an axially outwardly opening annular recess 24 housing the elastomeric seal 18.

The ring collar 17 has an interior bore surface 25 slidably seated coaxially around the smaller tube 12. The ring collar 17 also has, adjacent surface 25, a radially inwardly opening annular recess 26 housing an elastomeric seal 19. The body portion of the ring collar 17 has a radial extent, as indicated at 27, less than the diameter of the annular recess 21 in the flange nut 15 and yet sufficient to overlay the recess 24 in the round flange 16 housing the elastomeric seal 18.

When the elements of the assembly 10 are positioned relative one to the other and to the tubes 11 and 12, as shown in the drawing, the flange nut 15 will enclose and position the ring collar 17 in fluid pressure sealing relation to the tube 11 and the round flange 16 by compressive contact with the elastomeric seals 18 and 19. Further, the assembly 10 will permit only limited radial movement of the tubes 11 and 12, during axial movement of an apparatus component connected to one of the tubes.

As shown, the outer end of tube 11 may be threaded for communication with a pressure chamber in an apparatus component (not shown). Similarly, the outer end of the tube 12 may be threaded for connection to a stationary manifold (not shown) for the supply of fluid pressure.

Also as shown by the chain lines in the Drawing and as indicated by the numeral 30, in the event the operative span or length of the telescoping tubes 11 and 12 would be so great as to generate radial movement of the telescoping tubes, one or more stabilizing or hold-down collars could be used.

What is claimed is:

1. An assembly for maintaining a fluid pressure seal between rigid telescoping conduit tubes, said assembly comprising a flange nut, a round flange, a ring collar and elastomeric annular seals located and positioned coaxially around said tubes, said flange nut having an axial bore with interior threads for mating engagement with said round flange, an annular recess for movably enclosing the body portion of said ring collar, and a radially directed surface for positioning engagement with said ring collar, said round flange being secured coaxially to one end of the larger diameter tube and having peripheral threads thereon for mating engagement with interior threads of said flange nut and an axially outwardly opening recess therein housing an elastomeric seal, said ring collar having an interior bore surface slidably seated coaxially around the smaller diameter tube and having a radially inwardly opening annular recess therein housing an elastomeric seal, the body portion of said ring collar having a radial extent less than the inner diameter of said annular recess in the bore of the flange nut and sufficient to overlay said recess in said round flange housing an elastomeric seal, whereby, said flange nut will enclose and position said ring collar in fluid pressure sealing relation to said round flange and said elastomeric seals, while permitting limited radial movement of said telescoping tubes.

* * * * *